United States Patent
Stigler et al.

(10) Patent No.: US 7,048,592 B2
(45) Date of Patent: May 23, 2006

(54) FASTENER DEVICE FOR ELONGATED, FLAT OBJECTS, IN PARTICULAR FLAT CONDUCTOR STRIPS

(75) Inventors: Mario Stigler, Schoeffengrund (DE); Wolfgang Werner, Reutlingen (DE); Juergen Nitsch, Berglen (DE); Ernst-Ludwig Hahn, Rabenau (DE)

(73) Assignee: Newfrey LLC, Newark, DE (US)

( * ) Notice: Subject to any disclaimer, the term of this patent is extended or adjusted under 35 U.S.C. 154(b) by 8 days.

(21) Appl. No.: 10/801,677

(22) Filed: Mar. 17, 2004

(65) Prior Publication Data
US 2004/0235362 A1 Nov. 25, 2004

(30) Foreign Application Priority Data
Mar. 18, 2003 (DE) .................. 103 12 015

(51) Int. Cl.
*H01R 9/22* (2006.01)
(52) U.S. Cl. .................................... 439/719
(58) Field of Classification Search ............... 439/719; 211/126.7, 126.12, 126.1; 248/65, 68.1, 248/74.1; 174/137 R, 135, 138 G, 154
See application file for complete search history.

(56) References Cited

U.S. PATENT DOCUMENTS

| 3,715,705 A | * | 2/1973 | Kuo ........................... 439/422 |
| 4,356,799 A | * | 11/1982 | Clark ....................... 123/90.65 |
| 4,913,656 A | * | 4/1990 | Gordon et al. ................ 439/67 |
| 5,151,560 A | * | 9/1992 | Kreinberg et al. ........ 174/94 R |
| 5,817,983 A | * | 10/1998 | Rodkey et al. ............. 174/135 |
| 6,771,516 B1 | * | 8/2004 | Leman et al. ............... 361/825 |

FOREIGN PATENT DOCUMENTS

| DE | 100 45 765 | 2/2002 |
| DE | 101 29 833 | 2/2002 |
| DE | 101 51 120 | 4/2002 |

\* cited by examiner

*Primary Examiner*—Briggitte Hammond
*Assistant Examiner*—James R. Harvey
(74) *Attorney, Agent, or Firm*—Miles & Stockbridge PC

(57) ABSTRACT

A device for fastening objects such as flat conductor strips to a substrate comprises a pedestal and separate object holders. Each object holder has an object holding portion and a fastening portion by which the object holder is attached to the pedestal.

34 Claims, 8 Drawing Sheets

FASTENER DEVICE FOR ELONGATED, FLAT OBJECTS, IN PARTICULAR FLAT CONDUCTOR STRIPS

CROSS-REFERENCE TO RELATED APPLICATION

This application claims the benefit of German Patent Application DE 103 12 015.7 filed Mar. 18, 2003, incorporated herein by reference.

BACKGROUND OF THE INVENTION

The invention relates to a device for fastening of elongated, flat objects, in particular flat conductor strips, to a substrate, having a holder comprising a holding portion with means for securing at least one elongated, flat object and a fastening portion intended for attachment of the holder.

Devices of the specified kind are employed for fastening flat electrical conductor strips to body parts of automobiles, for example. In such flat conductor strips, also called film conductors or flat strip cables, a number of conductor strands are placed side by side on a thin, electrically insulating support layer and covered with an electrically insulating cover layer. Other embodiments of flat conductor strips consist of a plurality of conductors arranged parallel to each other and covered with an insulator, connecting segments of the insulator extending between neighboring conductors. In laying flat conductor strips, it may be required to fasten them to a substrate at intervals.

DE 101 29 833 A1 discloses a clamp for holding a flat strip cable, comprising a U-shaped base part to accommodate the flat strip cable, a cover part connected to the base part, a projection extending from the base part, and a pressure part arranged on the cover part and holding down the flat strip cable accommodated by the base part when the cover part is closed. In the flat strip cable, a slit is provided into which the projection enters. On the under side of the base part, there is a "clip" to be inserted into a hole of an automobile body in order to attach the flat strip cable there.

In a device disclosed in DE 100 51 120 A1 for fastening flat strip cables to a support plate, two elastically spreadable extensions project from a base plate, their ends connected by a three-part strut whose total length is greater than the distance between the two extensions and whose three parts are connected to each other and to the ends of the extensions hinge-fashion. The base plate is placed on the flat strip cable to be fastened to the support plate, and by depressing the middle portion of the strut, the spreadable extensions are pressed against pins arranged on the support plate and protruding through engagement holes in the base plate, being thereby fixed to the base plate in that position.

Using the known fastening devices, several flat strip cables may alternatively be fastened one above another. Since in that case, the holding device cannot be closed until all lines to be fastened have been placed in it, in unfavorable installation positions, for example with overhead arrangement, special aids must be employed to hold the bottom layers of the flat conductor strips until, after the top layer has been placed, the device can be closed.

DE 100 45 765 D1 discloses a turning device for a film conductor, comprising a turning flap having a turning edge and a protecting edge. In the state of insulation, the film conductor is clamped between a base flap and the turning flap on the one hand and between the turning edge and the protecting edge on the other hand. The turning device enables the film conductor to make a 90° turn, for example, and at the same time serves to fasten it to a substrate. For this purpose, the turning device comprises fastening elements on the under side of the installation, intended to engage an opening in a support part.

BRIEF DESCRIPTION OF THE INVENTION

An object of the invention is to provide a device for fastening elongated, flat objects, in particular flat conductor strips, of the kind initially mentioned, that is especially simple to install and manipulate.

According to one embodiment of the invention, the device comprises a pedestal fastenable separately from the holder to a substrate, for example an automobile bodywork, cooperable coupling elements being provided on the pedestal and on a fastening portion of the holder, for connection of the holder to the pedestal.

By virtue of the invention, attachment of flat conductor strips to a holder, attachment of a pedestal to a substrate, and attachment of holders to the pedestal can be carried out in separate operations. Attachment of the pedestal to the substrate by any appropriate attachment device does not interfere with the other attachment operations and avoids the risk of damaging flat conductor strips.

In a preferred embodiment, the pedestal has a recess for receiving a fastening portion of a holder or holders, cooperable coupling elements being provided in the recess and on a fastening portion of each holder. Multiple holders can be attached to the pedestal in a stacked configuration, each holder having a fastening portion in the recess of the pedestal and having a holding portion for receiving and fixing a flat conductor strip.

BRIEF DESCRIPTION OF THE DRAWINGS

The invention will be further described in conjunction with the accompanying drawings which illustrate preferred (best mode) embodiments, and wherein.

DETAILED DESCRIPTION OF THE INVENTION

Figure 1:
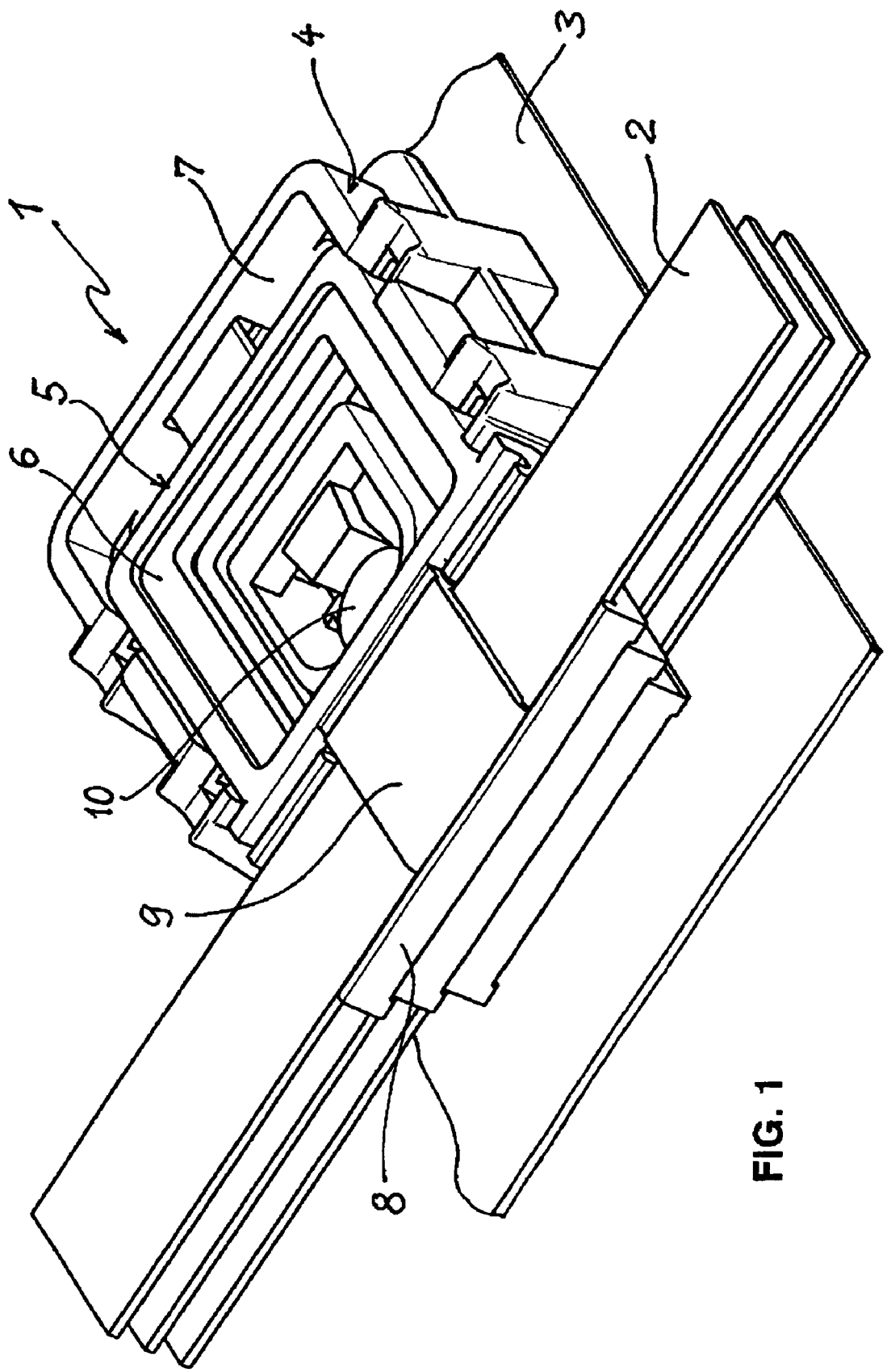
FIG. 1 shows a perspective representation of a device for holding three flat conductor strips.

FIG. 1 shows a fastening device 1 intended for fastening several flat conductor strips 2 to a substrate 3, for example the bodywork of an automobile. The fastening device 1 comprises a pedestal 4 and several holders 5 arranged one above another and fixed by their fastening portions 6 in a central recess 7 of the pedestal 4. Each holder 5 has a holding portion 8 extending outside the pedestal 4, to which portion a flat conductor strip 2 is attached by a closable flap 9. The pedestal 4 may be fastened to the substrate 3 with the aid of a T-bolt 10 buttoned into an opening of the pedestal 4.

Figures 2, 3:
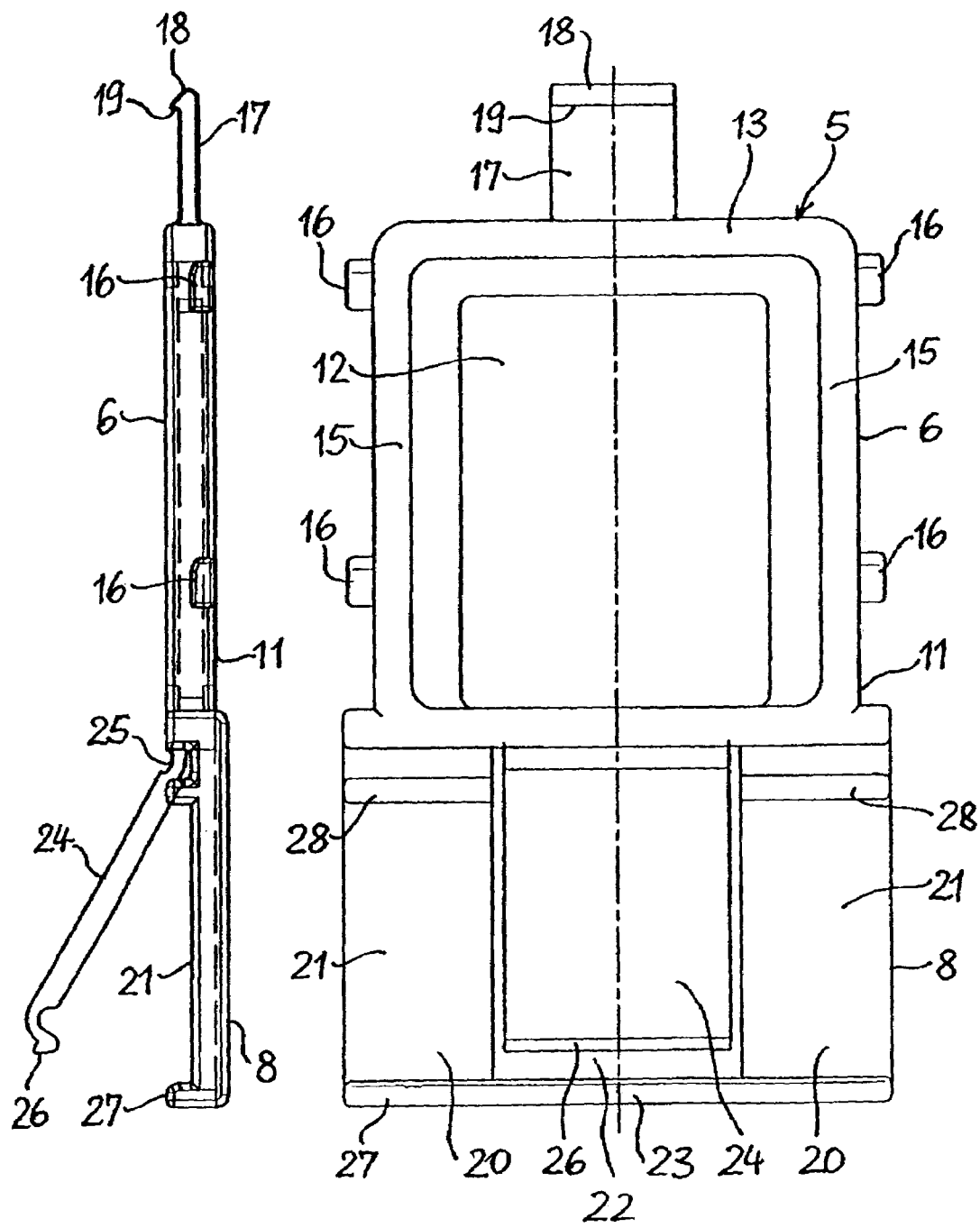
FIG. 2 shows a side view of a holder of the device according to FIG. 1.
FIG. 3 shows a top view of the holder of the device according to FIG. 1.

As may be seen from FIGS. 2 and 3, the holder 5 has a base part 11 in the form of a substantially flat plate, forming a rectangular holding portion 8 and a fastening portion 6. The fastening portion 6 is in the form of a frame having a central opening 12, two shorter frame legs 13, 14 and two longer frame legs 15. The two longer frame legs 15 bear, in symmetrical arrangement on their outside, two nub-like projections 16 serving to support the holder 5 on the pedestal 4. The shorter frame leg 13 more distant from the fastening portion 6 comprises, on its outside, a spring tongue 17 extending parallel to the plane of the frame and bearing a snap hook 18 at its free end, with a latching surface 19 of the snap hook 18 facing the frame leg 13.

The shorter frame leg 14 of the fastening portion 6 adjoins the holding portion 8, which comprises two legs 20 in prolongation of the frame legs 15, with bearing surfaces 21 lying in a common plane. The legs 20 are separated from one another by an opening 22, and their ends opposed to the frame leg 14 are connected to one another by a leg 23. Over the opening 22, there is a flap 24 swingably fastened to the leg 14 by a flexible hinge 25. The opening 22 is provided so that the holder can be produced in a simple forming tool without a slide.

The free end of the flap 24 is provided with a snap nose 26 undergrasping a segment of the leg 23 towards the opening 22 to latch the flap 24 in closed position. The leg 23, with prolongations extending along the bearing surfaces 21, forms a through rib 27 projecting from the bearing surfaces 21 to guide laterally a flat conductor strip arranged on the bearing surfaces 21. At a distance from the rib 27 and parallel thereto, ribs 28 are provided on the legs 20, likewise projecting from the respective bearing surfaces 21 to guide laterally the flat conductor strip.

In order to fasten a flat conductor strip to the holder 5, the strip is placed on the bearing surfaces 21 with flap 24 opened. Then the flap 24 is closed and fixed to the leg 23 with the aid of the catch nose 26. In this way, the flat conductor strip is completely embraced and clamped by the holding portion 8 of the holder 5 and thereby dependably connected to the holder 5.

Figure 4:
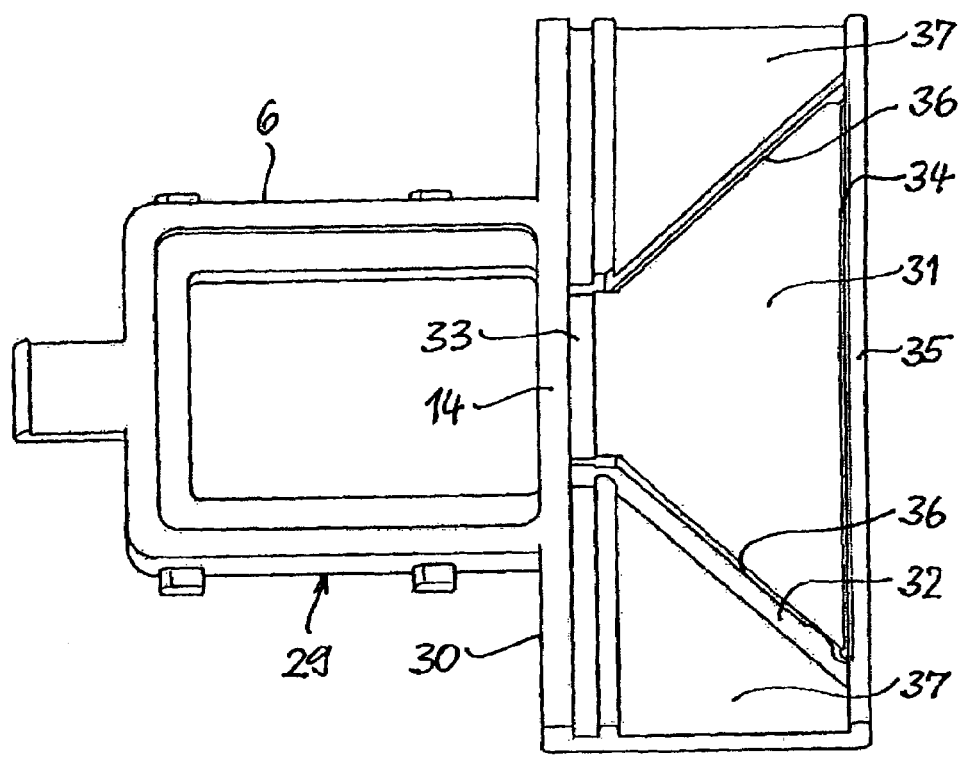
FIG. 4 shows an embodiment of a holder suitable for making a turn in a flat conductor strip.

FIG. 4 shows a holder 29 differing from the holder 5 by a modification of its holding portion 30 and suitable for making a turn in a flat conductor strip. The fastening portion of the holder 29 is similar to that of the holder 5. The holding portion 30 has a trapezoidal flap 31 arranged over a trapezoidal opening 32. The short parallel side of the flap 31 is connected to the frame leg 14 of the fastening portion 6 by a flexure hinge 33. The long parallel side of the flap 31 is provided with a snap bar 34 snapping into a recess of the outer leg 35 of the holding portion 30 to hold the flap 31 in the closed position shown in the drawing. The side edges 36 of the flap 31 are inclined at a 45° angle to the lengthwise axis of the leg 35.

A flat conductor strip placed in the holding portion 30 and secured by the closed flap 31 may be turned by folding at an angle of 90° on one of the side edges 36. If the flat conductor strip is folded on both side edges 36, the flat conductor strip is turned through an angle of 180°. The legs 37 of the holding portion 30, located on either side of the opening 32, serve to guide and support the flat conductor strip if it is not turned. When turned, owing to their protrusion they form a lateral protection for the folded edge of the flat conductor strip.

Figure 5:
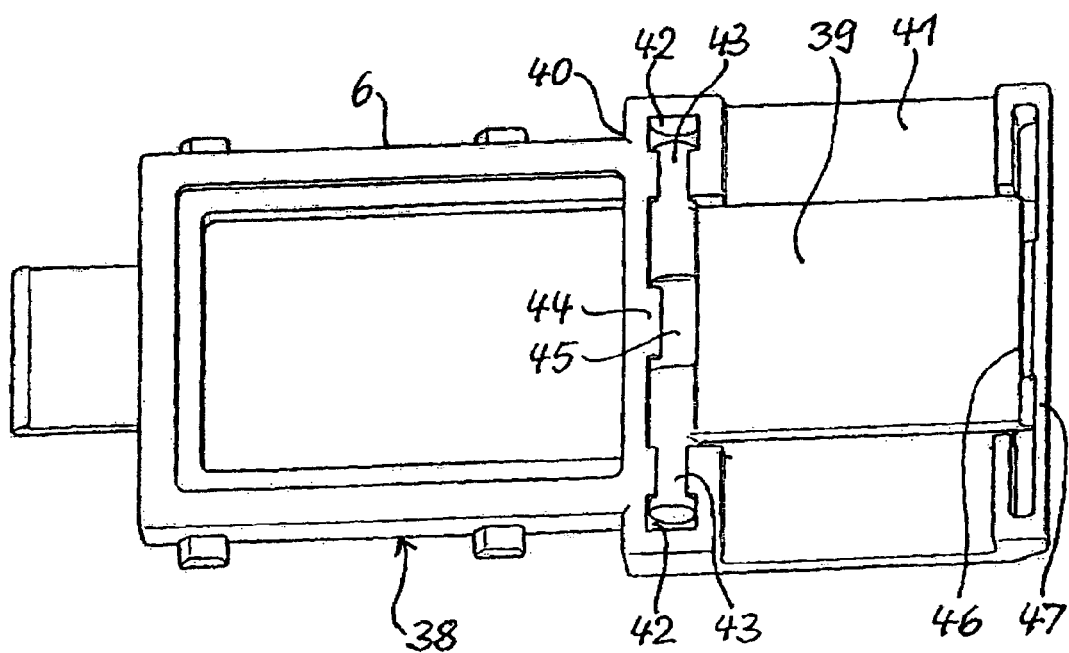
FIG. 5 shows a two-part embodiment of a holder of the device according to the invention.

FIG. 5 shows a holder 38 having a flap 39 produced separate from the holder 38 and then movably connected to it. The base part 40 here comprises a closed plate 41 extending continuously under the flap 39 in the holding portion. At its reinforced long side adjoining the holder 5, the plate has two bearing grooves 42 arranged at a distance from one another. In the bearing grooves 42, cylindrical bearing pins 43 are lodged, arranged at one end of the flap 39. The bearing pins 43 engage the bearing grooves 42 over more than half of their circumference. The aperture of the bearing grooves 42 is smaller than the diameter of the bearing pins, so that the bearing pins are held geometrically in the bearing grooves 42. The opening of the bearing grooves 42 is wide enough to permit buttoning of the bearing pins 43 into the bearing grooves 42, utilizing the elastic deformability of the material.

In the closed position, the flap 39 is additionally secured against loosening at its axis of swing, formed by the bearing pins 43, by a rib 44 located on the base part 40 in the center between the bearing grooves 42 and engaging a recess 45 on the top of the flap 39. With flap 39 completely opened, the edge of the recess 45 is so far distant from the rib 44 that the insertion of the flap 39 in the bearing grooves 42 is not impeded by the rib 44.

As in the case of the other holders already described, the flap 39 likewise is held in the closed position by a snap closure 46 cooperating with a catch at its free end, the closure being configured on an elastically deformable leg 47 of the base part 40.

Figure 6:
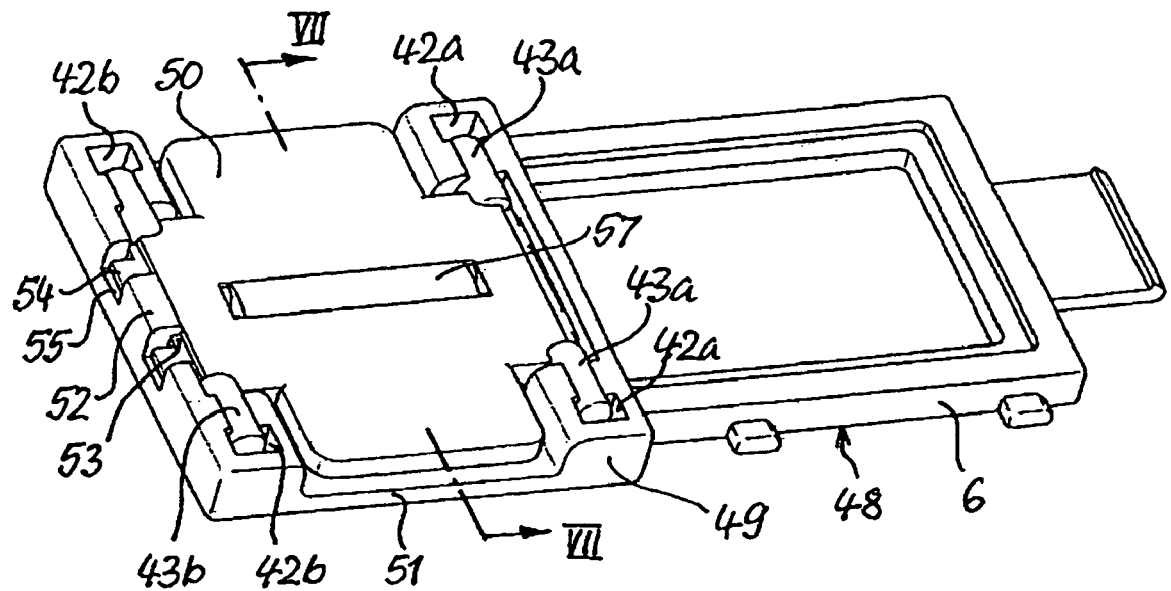
FIG. 6 shows a two-part embodiment of a holder of the device according to the invention, with symmetrical flap.
Figure 7:
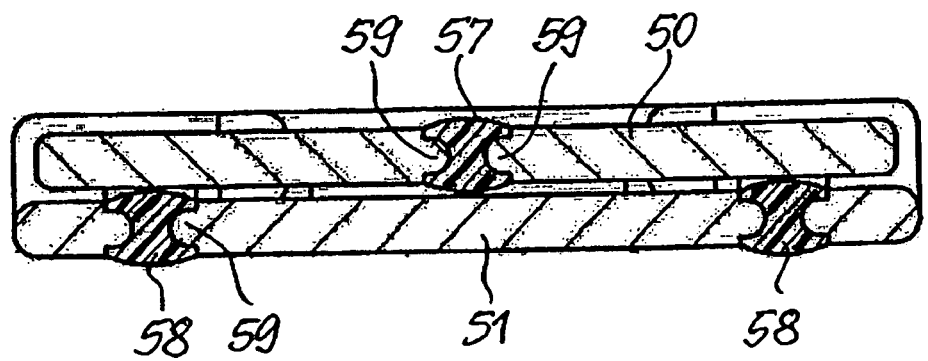
FIG. 7 shows a cross-section of the holder according to FIG. 6 at the line VII—VII.
Figure 8:
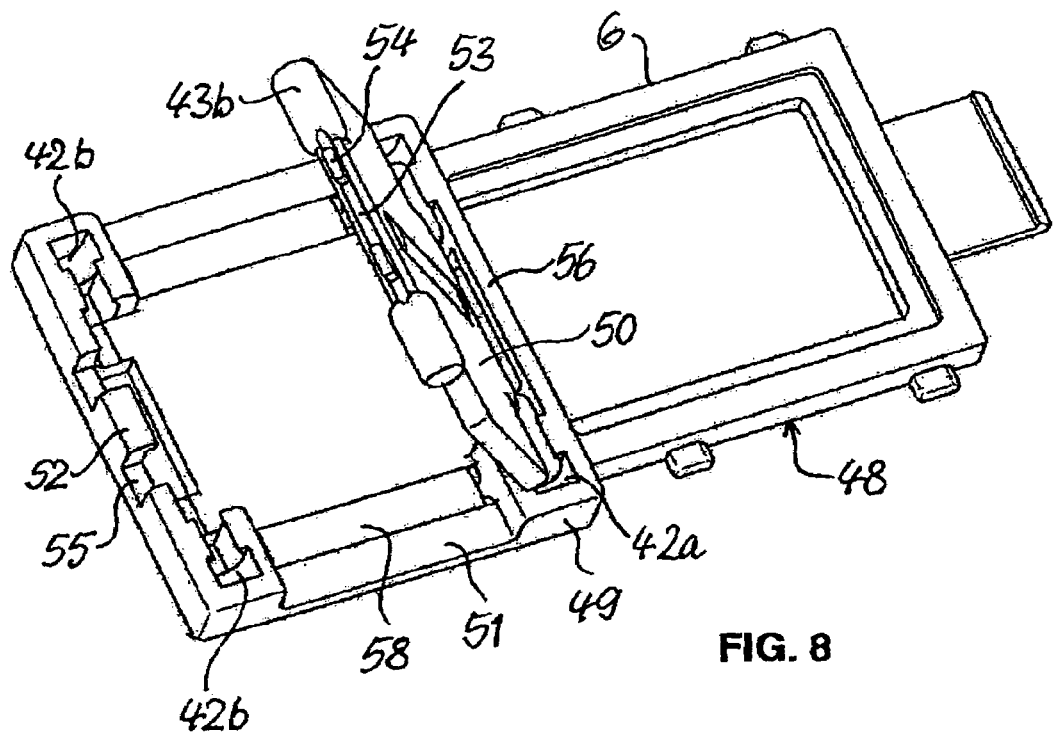
FIG. 8 shows a perspective representation of the holder according to FIG. 6.

In the case of the conformation of a holder 48 as shown in FIGS. 6 to 8, the flap 50, produced separately from the base part 49, is of completely symmetrical configuration. This simplifies the positional orientation of the flap 50 before assembly, and facilitates an automatic installation of the flap 50. As in the case of the holder according to FIG. 5, the flap 50 comprises bearing pins 43a, 43b capable of buttoning into bearing grooves 42a, 42b in the base part 49. Since the flap 50, owing to its symmetrical conformation has four bearing pins, the base part 49 is likewise provided with four bearing grooves associated with the bearing pins. The bearing grooves 42a and bearing pins 43a adjacent to the fastening portion 6 serve for the swing mounting of the flap 50, whereas the bearing grooves 42b located at the free end of the holding portion 51 serve merely to hold fast the bearing pins 43b and hence also the flap 50 in closed position. Additionally, the flap 50 is secured in the closed position by a spring catch 52 arranged at the free end of the holding portion 51 and grasping a ledge 53 extending along the edge of the flap 50. The ledge 53 has two projections 54 engaging recesses 55 in the base part 49 on either side of the catch 52. On the other side, serving as swing bearing of the flap 50, projections 54 there, not visible in the drawing, grasp a segment 56, extending between the bearing grooves 42a, of the base part 49, thereby preventing the swing bearing side of the flap 50 from coming loose from the base part 49.

In order to clamp the flat conductor strip in the holding portion 51 with a defined pressure and prevent it from shifting in lengthwise direction, inserts 57, 58 of soft elastic material, for example rubber or TPE, may be arranged in the flap 50 and in the base part 49 covered over by the flap 50, as may be seen particularly in FIG. 7. The inserts 57, 58 extend transverse to the lengthwise direction of the flat conductor strip to be clamped in place over the entire width of the bearing surface of the flap 50 and the base part 49. The inserts 57, 58 are arranged in slots of the flap 50 and/or base part 49 and protrude from them on both sides of the flap 50 or base part 49 with a slightly convex surface. On their lengthwise sides located in the slots, the inserts 56, 57 are grooved and geometrically held by spring portion 59 of the flap 50 and base part 49 engaging the grooves. On the flap 50, the insert 57, for reasons of symmetry, is located in the middle. In the base part 49, two inserts 58 are arranged at the same distance from the center. Depending on the thickness of the flat conductor strip, when closing the flap 50 the inserts 57, 58 are pressed more or less firmly into the slots, thus acting on the flat conductor strip with a defined force and fixing it in the holder by friction.

The pedestal 4 of the fastening device 1 is shown in detail in FIGS. 9 to 12. The pedestal 4 is preferably substantially in the shape of a rectangular prism configured symmetrically with respect to the lengthwise median plane E. On its long sides, the pedestal 4 is provided with reinforcing ribs 60, 61. The reinforcing ribs 60 are oriented perpendicular and the reinforcing ribs 61 parallel to the bottom surface 62. In the pedestal 4, there is a recess 7 open at the top 63 and at the front end 64. The recess 7 has a bottom surface 65, and in two planes located above, step surfaces 66, 67 parallel to the bottom surface, formed by steps 68, 69 enlarging the recess 7 towards the top 63 and parallel to the plane E. On the inside of the reinforcing ribs 60, grooves 70 are provided, passing through the pedestal 4 in the region of the steps 68, 69 completely from the bottom surface 62 to the top 63. The grooves 70 have parallel side walls 71, 72. In the side walls 72, block-shaped recesses are formed side by side, extending as far as the bottom surface 62 and each having an end surface 74 located at about half step height and extending at a distance from the step surfaces 66, 67 and from the top 63 parallel to the latter. The end surfaces 74 may be seen in FIG. 12. Between the end surfaces 74 and the neighboring step surfaces 66, 67, or bottom surface 65, each lying deeper, cutouts 73 are open towards the recess 7. Instead of several cutouts 73 located side by side, alternatively a single cutout with correspondingly positioned end surfaces may be provided in the side walls 72, and apertures opening into the recess 7.

Figure 14:
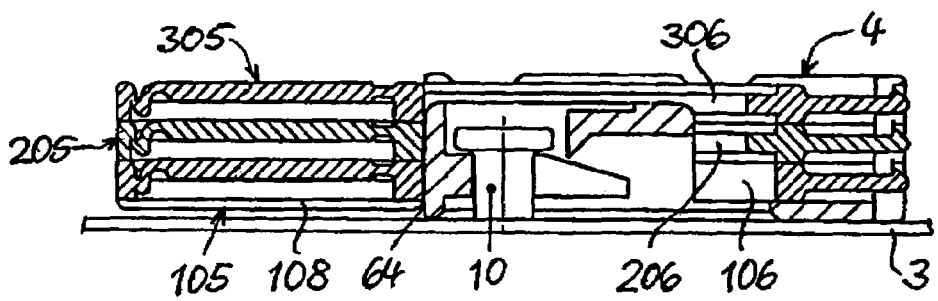
FIG. 14 shows a longitudinal section of the device according to FIG. 1 at the line A—A in FIG. 13.

In the middle of the recess 7, at a distance from the steps 68, 69, there is a wall 75 partly surrounding a fastening opening 76 in the bottom of the recess 7. The wall 75 bears a latch 77 located over the opening. Opposed to the latch 77, guide struts 78 are fixed at the edge of the opening 76, bounding a fastening opening 79 to accommodate a T-bolt 10, for example, with which the pedestal 4 is fastened to the substrate 3, as shown in FIG. 14. The latch 77, when the pedestal 4 is placed on the T-bolt 10, yields with spring action and snaps back into its latched position as soon as the T-bolt 10 is engaged in the fastening opening 79. In its latched position, the latch 77 fixes the T-bolt 10 in the fastening opening 79.

Figure 12:
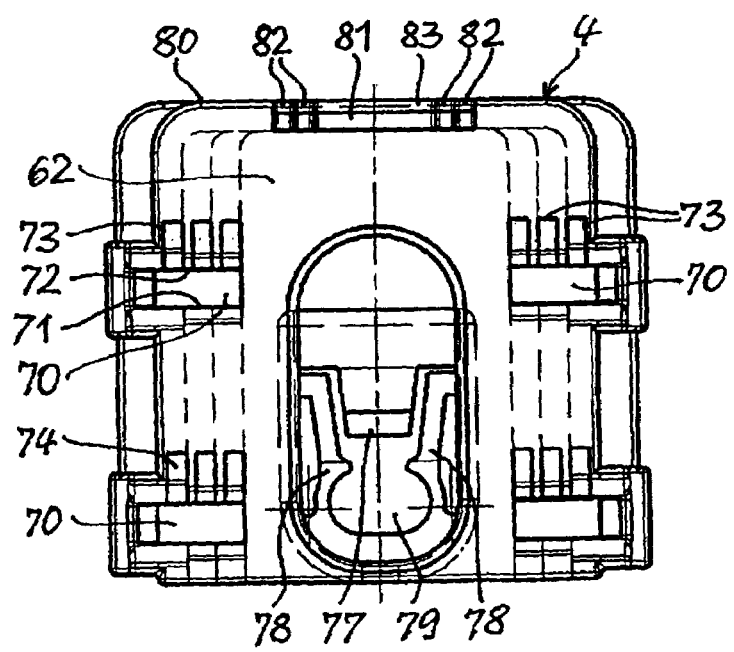
FIG. 12 shows a view of the pedestal according to FIG. 9 from beneath.
Figure 10:
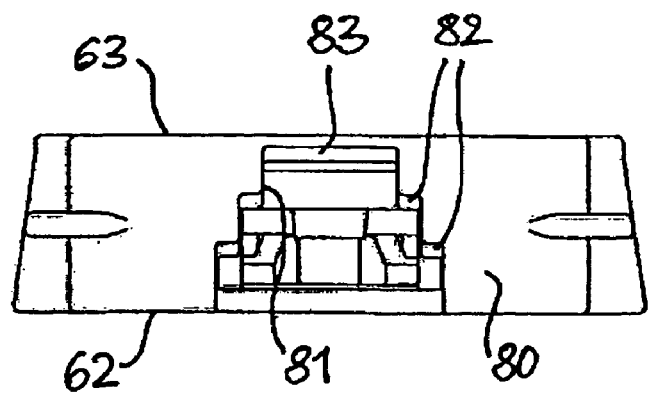
FIG. 10 shows a rear view of the pedestal according to FIG. 9.
Figure 9:
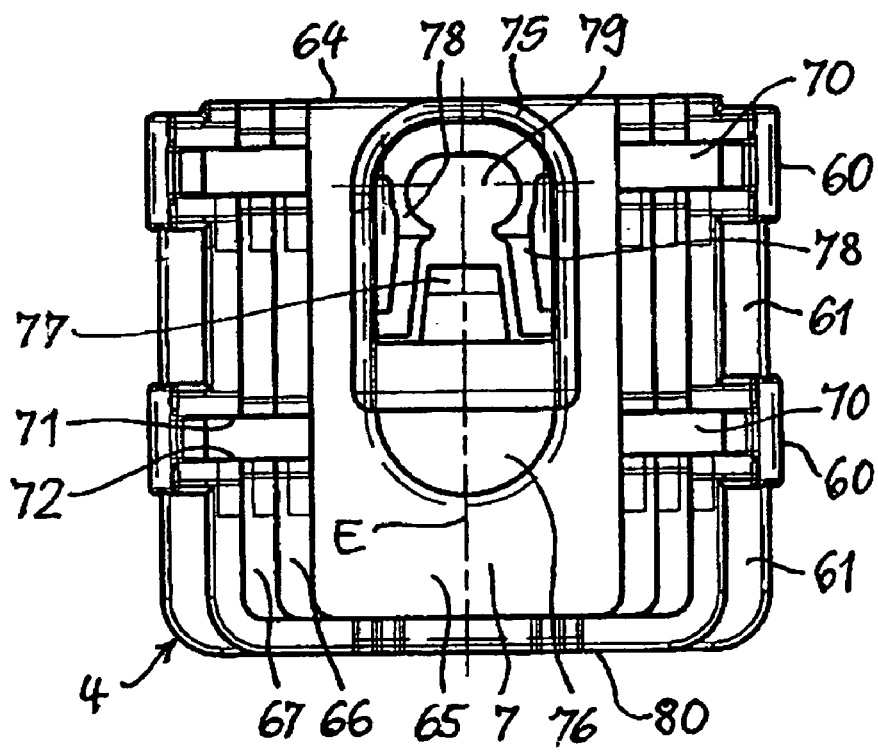
FIG. 9 shows a top view of an embodiment of the pedestal of the device according to FIG. 1.
Figure 11:
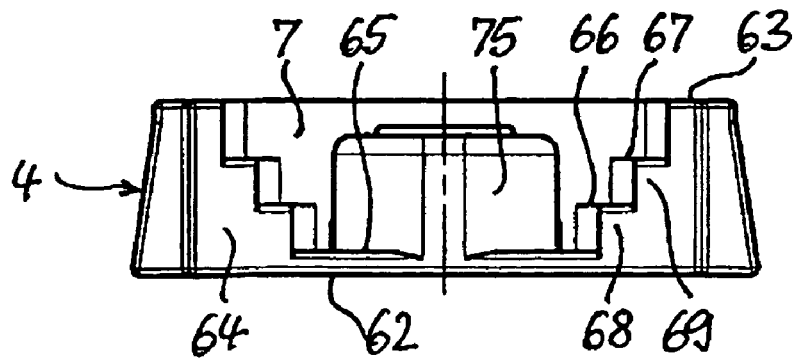
FIG. 11 shows a front view of the pedestal according to FIG. 9.

As may be seen in FIGS. 10 and 12, in the rear end 80 of the pedestal 4 there is an opening 81 whose width increases in two steps from the top down. Each step segment is intended to accommodate a tongue of a holder. At the steps, there are recesses 82 in which the snap hook arranged at the end of the tongue can engage. A corresponding recess 83 is provided at the upper edge of the opening 81.

Figure 13:
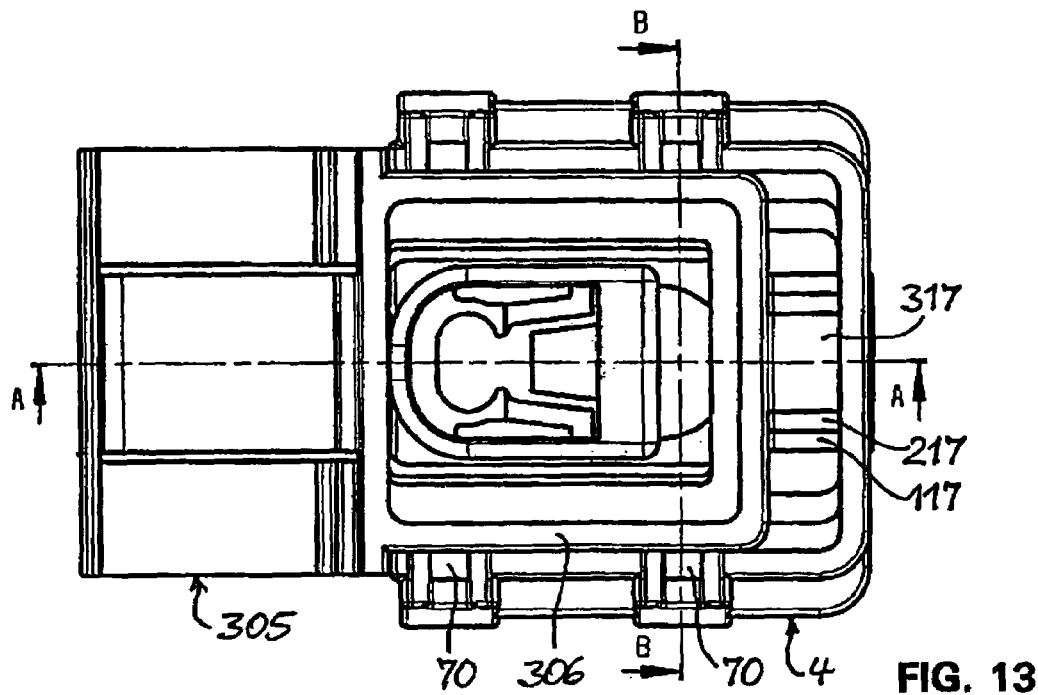
FIG. 13 shows a top view of the device according to FIG. 1.
Figure 15:
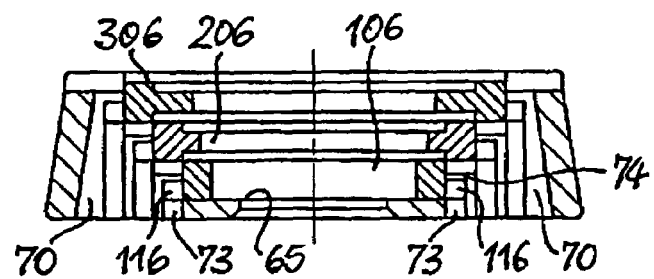
FIG. 15 shows a cross-section of the device according to FIG. 1 at the line B—B in FIG. 13.

In FIGS. 13 to 15, the attachment of several holders 105, 205 and 305 to the pedestal 4 is illustrated. The holders 105, 205 and 305 are of about the same structure as the holder 5 shown in FIGS. 2 and 3. However, they differ with respect to the width of their fastening portions, which are adapted to the distance of the mutually opposed steps 68, 69, or width of the upper opening of the recess 7. The fastening portion 106 of the holder 105 has the least width, and is intended for arrangement between the steps 68. For assembly, the holder 105 with fastening portion 106 is placed in the recess 7 of the pedestal 4 from above, with lateral projections 116 (like 16 in FIGS. 2 and 3) engaging the grooves 70. In this operation, the fastening portion 106 is in a position in the recess 7 in which the end of the tongue 117 is located inside the recess 7. As soon as the fastening portion 106 rests on the bottom surface 65, the holder 105 is shifted towards the rear end 80 of the pedestal 4. Then the projections 116 enter the cutouts 73, and the snap hook of the tongue 117 enters into the bottom segment of the opening 81, whereupon the tongue 117 gives way downward with spring action. The final position is reached when the holding portion 108, as shown in FIG. 14, butts against the front end 64 of the pedestal 4. In this position, the snap hook of the tongue 117 engages the recesses 82 at the opening 81 and thereby holds the holder 105 fast in the pedestal 4. The projections 116 in this position are located in the cutouts 73 under their end surfaces 74, and thereby secure the holder 105 geometrically against lifting out of the recess 7.

The holder 105 may be released from the pedestal 4 by exerting a pressure from above on the tongue 117 of the snap hook to get it out of the recesses 82 and at the same time pull the holder 105 forward by its holding portion 108. As soon as the projections 116 are located in the grooves 70 once more, the holder 105 can be taken out of the pedestal 4 upward, if no other holder is present.

The installation of the holders 205 and 305 is likewise carried out in the manner just described, the holder 205 with its fastening portion 206 being arranged between the steps 69, and the fastening portion 306 of the holder 305 in the opening of the recess 7. The width of the fastening portions 206 and 306 is correspondingly greater, the width of the tongues 217, 317 correspondingly smaller. From the different sizes of the several fastening portions, therefore, one skilled in the art can readily see in what sequence the holders are to be installed one after another.

Figure 16:
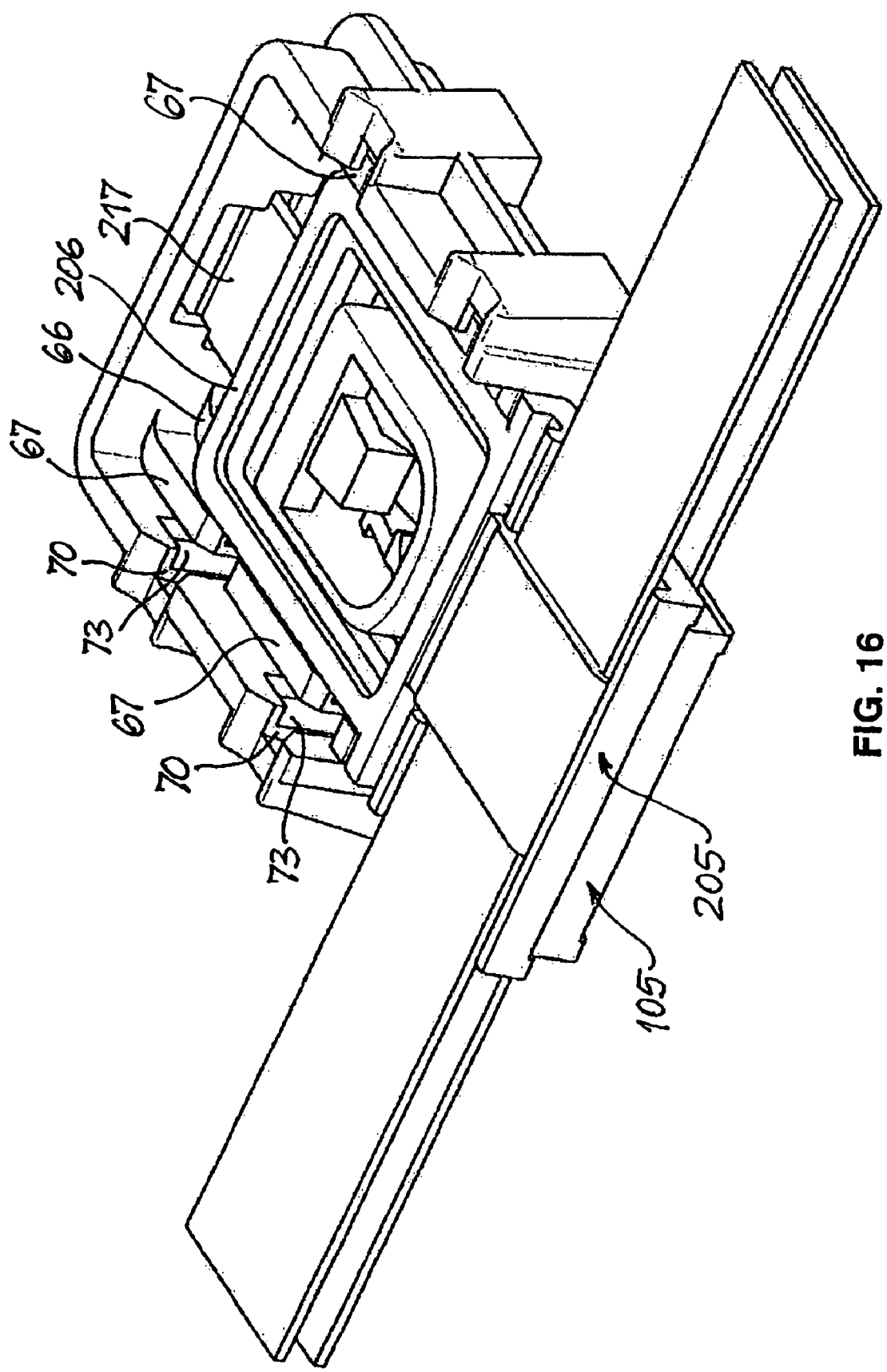
FIG. 16 shows a perspective representation of the device according to FIG. 1 equipped with two holders.

FIG. 16 shows an example of an application in which only two holders 105 and 205 are inserted in the pedestal 4. The accommodation for the holder 305 is empty. Hence the step surfaces 67 on which the holder 305 is placed, the groove 70 and the cutouts 73 to accommodate the projections 316 are readily identified.

An advantage of the invention is that various types of fastening devices, such as bolts, screws, rivets, catches, or bonded connections may be employed for attaching the pedestal to a substrate without impeding attachment of flat conductor strips to holders that are separate from the pedestal, and without subjecting the flat conductor strips to damage in the course of installation of the pedestal.

Instead of using a pin projecting from the substrate to engage and hold the pedestal, the pedestal may be provided on its underside facing the substrate with a tab or clip insertable in an opening of the substrate.

Holders of flat conductor strips are installed on the pedestal one-by-one reliably and securely by a simple motion routine. Each holder can be installed on the pedestal independently from other holders, and no additional aids are required to hold individual or multiple flat strip conductors during installation.

Parts of the device of the invention can be made of thermoplastic synthetic material, for example using a two-component injection molding process.

While preferred embodiments of the invention have been shown and described, it will be apparent that changes can be made without departing from the principles and spirit of the invention, the scope of which is defined in the appended claims.

What is claimed is:

1. A device for fastening elongated, flat objects, in particular flat conductor strips, to a substrate, with a holder comprising a holding portion having means for securing at least one elongated, flat object, and a fastening portion, characterized by a pedestal separate from the holder and fastenable to a substrate, cooperable coupling elements being provided on the pedestal and on the fastening portion of the holder, respectively, to attach the holder to the pedestal, wherein the pedestal has a bottom surface with spaced side walls and a rear wall all upstanding from the bottom surface to provide a recess between the bottom surface and the walls that is open at the top and at the front of the recess, and wherein the fastening portion of the holder is constructed for insertion into the recess through the open top to position the cooperable coupling elements for coupling the fastening portion of the holder to the pedestal, with the holding portion outside the recess and extending to the fastening portion via the open front of the recess.

2. A device according to claim 1, characterized in that the recess has grooves and/or projections on the side walls thereof, forming at least some of the coupling elements on the pedestal, and at least some of the coupling elements on the fastening portion of the holder comprise projections cooperating with the grooves of the pedestal and/or grooves cooperating with the projections of the pedestal.

3. A device for fastening elongated, flat objects, in particular flat conductor strips, to a substrate, with a holder comprising a holding portion having means for securing at least one elongated, flat object, and a fastening portion characterized by a pedestal separate from the holder and fastenable to a substrate, cooperable coupling elements being provided on the pedestal and on the fastening portion of the holder, respectively, to attach the holder to the pedestal,
characterized in that the pedestal comprises a recess to accommodate at least one fastening portion of a holder, the recess having grooves on at least two opposed side walls of the recess, forming at least some of the coupling elements on the pedestal, and at least some of the coupling elements on the fastening portion of the holder comprise projections cooperating with the grooves of the pedestal, and
characterized in that the grooves are parallel to each other and provided with at least one open end, the fastening portion of the holder having projections engaging the grooves when the holder is connected to the pedestal.

4. A device for fastening elongated, flat objects, in particular flat conductor strips, to a substrate, with a holder comprising a holding portion having means for securing at least one elongated, flat object, and a fastening portion, characterized by a pedestal separate from the holder and fastenable to a substrate, cooperable coupling elements being provided on the pedestal and on the fastening portion of the holder, respectively, to attach the holder to the pedestal,
characterized in that the pedestal comprises a recess to accommodate at least one fastening portion of a holder, the recess having grooves and/or projections on at least two opposed sides, forming at least some of the coupling elements on the pedestal, and at least some of the coupling elements on the fastening portion of the holder comprise projections cooperating with the grooves of the pedestal and/or grooves cooperating with the projections of the pedestal, and
characterized in that the holder is insertable with its fastening portion on the side of the pedestal away from the substrate in the recess of the pedestal by a first motion directed towards the substrate, and movable by a second motion extending transverse to said first motion into a position of engagement in which the holder is fixed to the pedestal.

5. A device according to claim 3, characterized in that the grooves have a lateral cutout and the projections of the holder, in the position of engagement connected with the pedestal, are arranged at the lateral cutouts of the grooves and there supported.

6. A device according to claim 5, characterized in that, to anchor the fastening portion of the holder in the position of engagement in the pedestal, a snap lock is provided, that becomes active when the projections of the holder are located in the cutouts of the pedestal.

7. A device for fastening elongated, flat objects, in particular flat conductor strips, to a substrate, with a holder comprising a holding portion having means for securing at least one elongated, flat object, and a fastening portion characterized by a pedestal separate from the holder and fastenable to a substrate, cooperable coupling elements being provided on the pedestal and on the fastening portion of the holder, respectively, to attach the holder to the pedestal,
characterized in that the pedestal comprises a recess to accommodate at least one fastening portion of a holder, the recess having grooves and/or projections on at least two opposed sides, forming at least some of the coupling elements on the pedestal, and at least some of the coupling elements on the fastening portion of the holder comprise projections cooperating with the grooves of the pedestal and/or grooves cooperating with the projections of the pedestal, and
characterized in that the recess of the pedestal comprises two or more segments lying in parallel planes one above another and offset from each other by a multi-step configuration of two opposed side walls of the recess, each segment being configured to accommodate a fastening portion, adapted in size to the segment in question, of a holder.

8. A device according to claim 1, characterized in that the pedestal has an opening to accommodate a fastening pin projecting from the substrate with an undercut and holding means engaging the undercut of the fastening pin.

9. A device according to claim 1, characterized in that the pedestal on its under side towards the substrate is provided with a mounting pin or clip insertable in an opening of the substrate.

10. A device for fastening elongated, flat objects, in particular flat conductor strips, to a substrate, with a holder comprising a holding portion having means for securing at least one elongated, flat object, and a fastening portion, characterized by a pedestal separate from the holder and fastenable to a substrate, cooperable coupling elements being provided on the pedestal and on the fastening portion of the holder, respectively, to attach the holder to the pedestal, and characterized in that the holder comprises an essentially plate-shaped base part forming the holding portion and the fastening portion arranged to lie side-by-side, the holding portion comprising a bearing surface for an elongated, flat object, guide elements at edges of the bearing surface, and a flap swingably attached to the base part and, in a locking position capable of being held fast on the base part, clamping the object arranged on the contact surface.

11. A device according to claim 1, characterized in that the fastening portion of the holder, on its opposed sides adjacent to the holding portion, comprises two projections arranged at a distance from one another to engage grooves of the pedestal.

12. A device according to claim 1, characterized in that the holder at its end opposed to the holding portion has a spring tongue projecting from a base part and bearing a catch hook cooperating with the pedestal at its free end.

13. A device according to claim 1, characterized in that the fastening portion of the holder has a central opening.

14. A device according to claim 10, characterized in that the flap is connected to the holder by a hinge.

15. A device according to claim 10, characterized in that the flap comprises cylindrical bearing pins capable of buttoning into a partially cylindrical bearing recess in the holder.

16. A device according to claim 10, characterized in that on the holder or on the flap, a snap hook is attached, cooperating respectively with a projection on the flap or on the holder.

17. A device according to claim 14, characterized in that the flap has projections on the hinge side that, in closed position of the flap, engage a recess of the holder and secure the flap additionally at the hinge against coming loose.

18. A device according to claim 10, characterized in that, on the flap and/or in the bearing surface of the holder a convex rib of a soft elastic material is provided.

19. A device according to claim 18, characterized in that the rib consists of an insert inserted in a slot of the holder or of the flap.

20. A device according to claim 18, characterized in that the rib is produced by a two-component injection molding process jointly with the holder or with the flap.

21. A device according to claim 10, characterized in that the flap comprises a lateral turn edge extending at an angle to the lengthwise direction of the object corresponding to the angle of the turn.

22. A device according to claim 10, characterized in that the flap is symmetrical.

23. A device for fastening an object to a substrate, comprising:
a pedestal constructed for attachment to the substrate; and
a holder for the object, wherein
the holder is separate from the pedestal and has an object holding portion and a pedestal fastening portion, and wherein the pedestal and the pedestal fastening portion have cooperable coupling elements for attaching the fastening portion of the holder to the pedestal, wherein the pedestal has a bottom surface with spaced side walls and a rear wall all upstanding from the bottom surface to provide a recess between the bottom surface and the walls that is open at the top and at the front of the recess, and wherein the fastening portion of the holder is constructed for insertion into the recess through the open top to position the cooperable coupling elements for coupling the fastening portion of the holder to the pedestal, with the holding portion outside the recess and extending to the fastening portion via the open front of the recess.

24. A device according to claim 23, including a plurality of the holders, and wherein each fastening portion and the pedestal have cooperable coupling elements for attaching the fastening portion to the pedestal.

25. A device according to claim 24, wherein the fastening portions and the pedestal are constructed so that a plurality of fastening portions are received on the pedestal in a stacked configuration.

26. A device according to claim 25, wherein the fastening portions in the stacked configuration are of different sizes.

27. A device according to claim 26, wherein the cooperable coupling elements of the pedestal include steps constructed to support corresponding fastening portions.

28. A device for fastening an object to a substrate, comprising:
a pedestal constructed for attachment to the substrate; and
a holder for the object, wherein
the holder is separate from the pedestal and has an object holding portion and a pedestal fastening portion, and wherein the pedestal and the pedestal fastening portion have cooperable coupling elements for attaching the fastening portion of the holder to the pedestal, wherein the pedestal has an opening for receiving the fastening portion of the holder, and the cooperable coupling elements are constructed so that they become effective to attach the fastening portion to the pedestal by inserting the fastening portion into the opening and then moving the inserted fastening portion in a predetermined direction.

29. A device according to claim 28, wherein the predetermined direction is transverse to a direction of insertion of the fastening portion into the opening of the pedestal.

30. A device according to claim 23, wherein the holding portion is constructed to receive and hold a substantially flat object.

31. A device according to claim 30, wherein the holding portion comprises a clamp.

32. A device for fastening an object to a substrate, comprising:
a pedestal constructed for attachment to the substrate; and
a holder for the object, wherein
the holder is separate from the pedestal and has an object holding portion and a pedestal fastening portion, and wherein the pedestal and the pedestal fastening portion have cooperable coupling elements for attaching the fastening portion of the holder to the pedestal, wherein the holding portion is constructed to receive and hold a substantially flat object, wherein
the holding portion comprises a clamp, and wherein
the clamp comprises a base and a flap hinged to the base and constructed to be latched thereto.

33. A device according to claim 32, wherein the flap has an edge about which the object can be bent to change the direction of the object.

34. A device according to claim 32, wherein the flap is substantially symmetrical and the flap and the base are constructed to permit either of opposite edge portions of the flap to serve as a hinge for the flap on the base and as a latch for fixing the flap to the base.

* * * * *